(12) United States Patent
Reber

(10) Patent No.: US 6,949,198 B2
(45) Date of Patent: Sep. 27, 2005

(54) STRAINER FOR A WATER HOSE

(76) Inventor: Larry F. Reber, 5963 Fountain Nook Rd., Apple Creek, OH (US) 44606

( * ) Notice: Subject to any disclaimer, the term of this patent is extended or adjusted under 35 U.S.C. 154(b) by 25 days.

(21) Appl. No.: 10/762,184

(22) Filed: Jan. 21, 2004

(65) Prior Publication Data
US 2004/0164031 A1 Aug. 26, 2004

Related U.S. Application Data
(60) Provisional application No. 60/442,343, filed on Jan. 24, 2003.

(51) Int. Cl.[7] ............................................. B01D 37/00
(52) U.S. Cl. ...................... 210/747; 210/767; 210/170; 210/250; 210/416.1; 210/460
(58) Field of Search ................ 210/747, 767, 210/170, 220, 249, 250, 251, 416.1, 416.3, 449, 455, 459, 460, 461, 462, 463, 499

(56) References Cited

U.S. PATENT DOCUMENTS

| | | | | |
|---|---|---|---|---|
| 615,847 A | * | 12/1898 | Hansen | 210/460 |
| 705,364 A | * | 7/1902 | Kurtz | 210/170 |
| 2,503,455 A | * | 4/1950 | Sheren | 210/318 |
| 2,512,877 A | * | 6/1950 | Rike | 210/172 |
| 2,580,209 A | * | 12/1951 | Wiley | 210/460 |
| 2,783,893 A | * | 3/1957 | Romanoff | 210/463 |
| 3,613,894 A | | 10/1971 | Clegg, Jr. | |
| 3,799,217 A | * | 3/1974 | Bauer | 141/1 |
| 4,357,238 A | | 11/1982 | Ziaylek, Jr. | |
| 4,647,374 A | | 3/1987 | Ziaylek et al. | |
| 5,922,197 A | * | 7/1999 | Sparks | 210/232 |

* cited by examiner

Primary Examiner—Robert James Popovics
(74) Attorney, Agent, or Firm—Hahn Loeser & Parks, LLP; Robert J. Clark

(57) ABSTRACT

An apparatus, a system and a method for obtaining sieved water, for fighting fires, from a source of water having foreign objects are disclosed. A strainer is connected to a tank via a hose such that water may be pumped from the strainer to the tank. The strainer includes a water inlet having a sieve-like material over it and a water outlet connector where the hose connects. The strainer is submerged in a source of water such as a pond or stream. As water enters the strainer via the water inlet, the sieve-like material prevents foreign objects such as rocks and leaves from entering the strainer. Therefore, the foreign objects never reach the tank. A pan may be connected to the bottom of the strainer to elevate the strainer above the bottom of the source of water. Such elevating helps achieve desired flow rates without stirring or roiling foreign objects such as sand or gravel that may be at the bottom of the source of water.

13 Claims, 7 Drawing Sheets

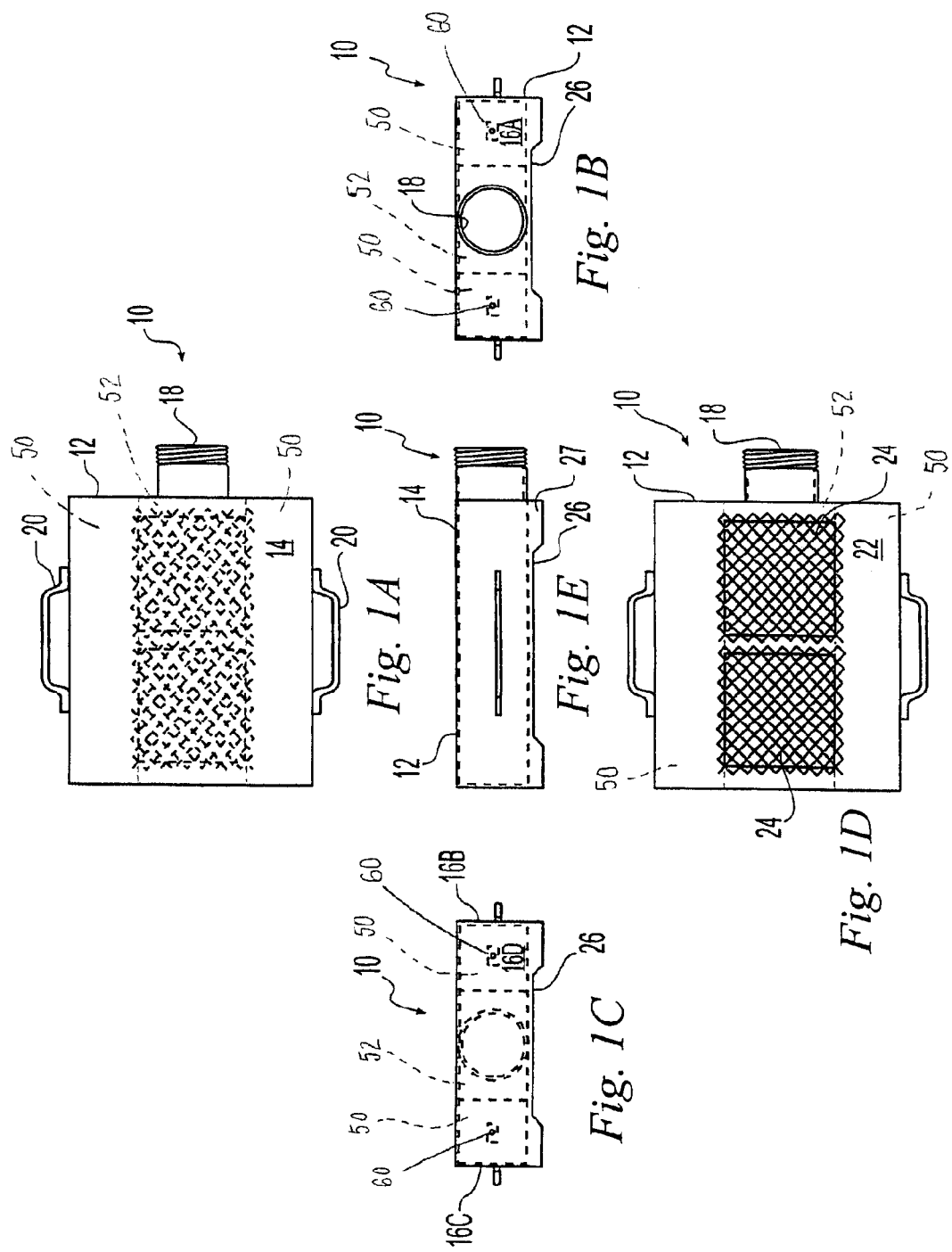

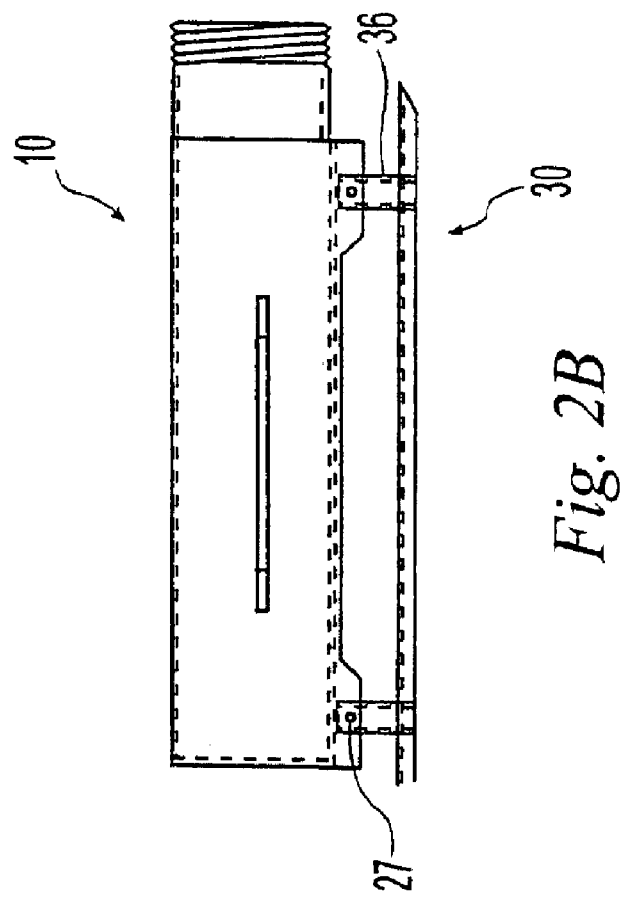
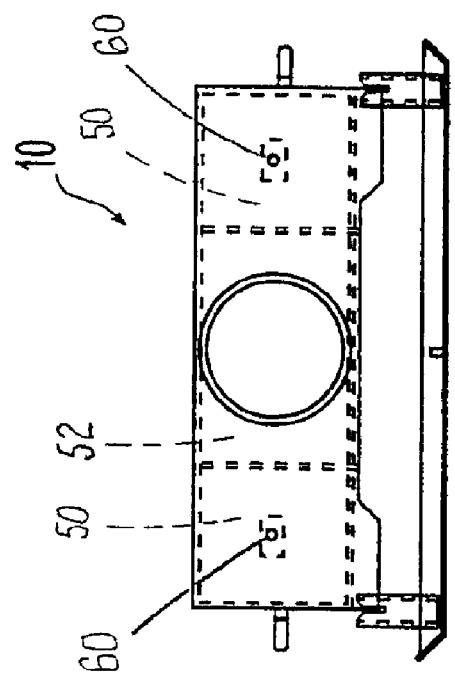
Fig. 2B
Fig. 2A

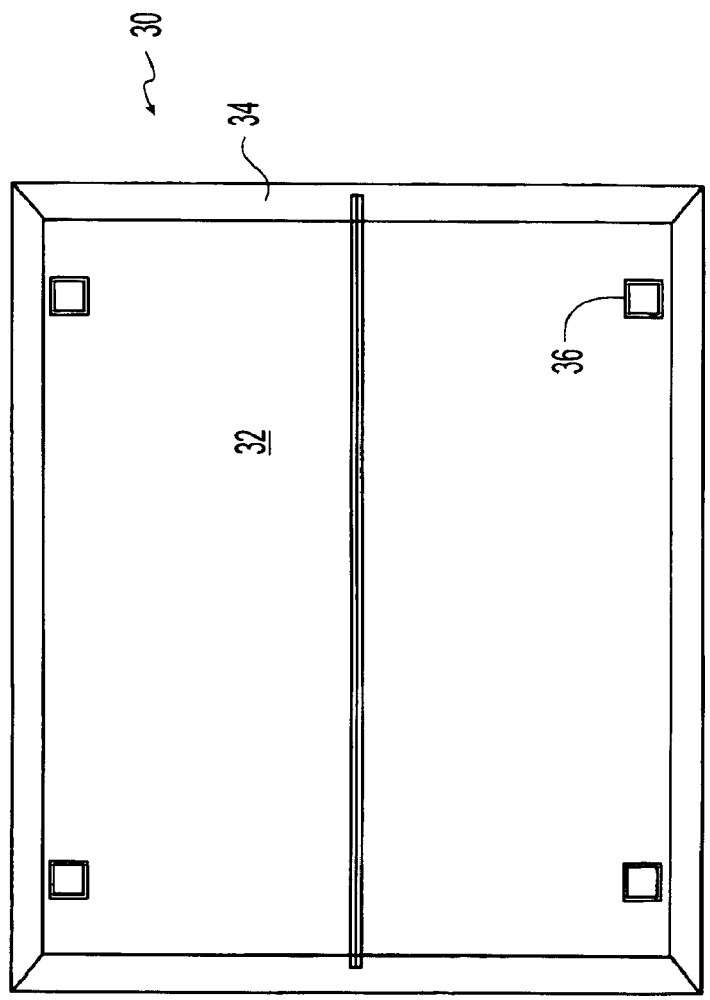
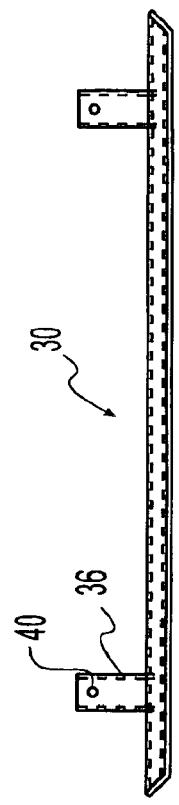
Fig. 4A
Fig. 4B

STRAINER FOR A WATER HOSE

CROSS-REFERENCE TO RELATED APPLICATIONS/INCORPORATION BY REFERENCE

This application claims priority to provisional U.S. Patent Application Ser. No. 60/442,343, filed on Jan. 24, 2003.

TECHNICAL FIELD

Certain embodiments of the present invention relate to a strainer device, particularly one that is used in association with water supplies in fire fighting, even more particularly in fire fighting in remote locations. Even more particularly, certain embodiments of the present invention relate to a strainer device that has a removable pan or plate that may be attached to the strainer, so that water from a source such as a creek, pond, lake, sea or the like may pass through the strainer at rates in excess of 1500 gallons per minute without disturbing a sand or gravel base in the water source.

BACKGROUND OF THE INVENTION

One of the seminal patents in this field is U.S. Pat. No. 3,613,894, to Clegg ("Clegg '894"), dated Oct. 19, 1971. That patent describes the use of "stop and go" (also known as "dump and go") tanks in the fighting of rural fires. A stop and go tank is simply a portable container which is transported to the fire, filled with water from a local source, and used to dispense the water through conventional fire hoses onto the fire. When the tank is emptied, it is refilled from the local water source. This technique is a desirable alternative to the use of shuttle trucks bringing water to the site, provided that a local water source is readily available.

According to Clegg '894, a problem that exists in dump and go tanks is the entry of foreign objects into the tank when a pond, stream or the like is used as the water source. Rather than doing anything to remove these foreign objects, Clegg '894 teaches a strainer device that remains in the tank and prevents the foreign objects from entering the hose which withdraws the water from the tank. However, the Clegg '894 device operates in the rather clean conditions inside the stop and go tank, not in a sandy or gravelly stream bed or beach.

Clegg '894 discloses the need to refill the tank of a dump and go tanker as quickly as possible and even discusses the problems in the tank associated with keeping the strainer in place during the swirling and whirlpooling that can occur during periods of rapid filling of the tank.

Clegg '894 is not the only patent that describes a strainer type device for use inside a dump and go tank. Another such invention in taught in U.S. Pat. No. 4,357,238, to Ziaylek, Jr., issued Nov. 2, 1982 ("Ziaylek '238"). That invention also teaches a strainer device which seeks to position itself as low in the tank as possible and remove foreign objects from the water flowing out of the tank into a hose, keeping the foreign objects in the tank.

Interestingly, when Ziaylek later obtained a patent (U.S. Pat. No. 4,647,374, Mar. 3, 1987) ("Ziaylek '374") describing an inlet head for removing water from a pool, pond or the like, the concept of using a strainer device that seeks the low spot in the water source was not a part of the invention. Ziaylek '374 teaches that the pumping of water from the bottom of a stream or pond may be substantially impeded if the strainer becomes clogged or covered with leaves or other debris.

While the need to keep foreign objects out of the fire hoses is certainly desired, an even more important desire is to prevent the foreign objects from ever getting into the tank in the first place. Clearly, when foreign objects enter the tank, they must eventually be removed. If they don't leave through the hoses, they will need to be cleaned out. This need not happen if the foreign objects never enter the tank.

It is desirable to prevent foreign objects from entering the tank while maintaining a high fill rate of the tank that it is at least 1500 gallons per minute, and preferably even higher.

Further limitations and disadvantages of conventional, traditional, and proposed approaches will become apparent to one of skill in the art, through comparison of such systems with the present invention as set forth in the remainder of the present application with reference to the drawings.

BRIEF SUMMARY OF THE INVENTION

An embodiment of the present invention provides an apparatus for straining water used in association with water supplies in fire fighting. The apparatus comprises a strainer housing comprising a first opening in the housing forming an inlet, a second opening in the housing forming an outlet, and a water channel between the housing inlet and outlet; a pan; and at least one stanchion connecting the pan to the strainer housing; wherein the pan is positioned in a spaced relationship to the inlet of the strainer housing.

An embodiment of the present invention provides a system for obtaining sieved water from a source for fighting fires. The system comprises a water strainer apparatus comprising a strainer housing, a pan, and at least one stanchion connecting the pan to the strainer housing in a spaced relationship, the strainer housing comprising a first opening in the housing forming an inlet, a second opening in the housing forming an outlet, and a water channel between the housing inlet and outlet; a tank to hold a volume of the strained water; and a hose connected between the water strainer apparatus and the tank to transport the strained water from the water strainer apparatus to the tank.

An embodiment of the present invention provides a method to obtain sieved water from a source for fighting fires. The method comprises providing a water strainer apparatus comprising a strainer housing, a pan and at least one stanchion connecting the pan to the strainer housing in a spaced relationship, the strainer housing comprising a first opening in the housing forming an inlet, a second opening in the housing forming an outlet, a water channel between the housing inlet and outlet, and an enclosed volume of space; submerging at least the inlet of the water strainer apparatus in a source of water; and connecting a second end of said hose to a tank.

These and other advantages and novel features of the present invention, as well as details of an illustrated embodiment thereof, will be more fully understood from the following description and drawings.

BRIEF DESCRIPTION OF SEVERAL VIEWS OF THE DRAWINGS

FIGS. 1A–1E illustrate isometric views of a strainer, in accordance with an embodiment of the present invention.

FIGS. 2A–2B illustrate elevation views of the strainer of FIGS. 1A–1E with a pan in place, in accordance with an embodiment of the present invention.

FIGS. 4A–4B illustrate a top plan view and a side elevation view of the pan of FIGS. 2A–2B, in accordance with an embodiment of the present invention.

DETAILED DESCRIPTION OF THE INVENTION

Figure 3:
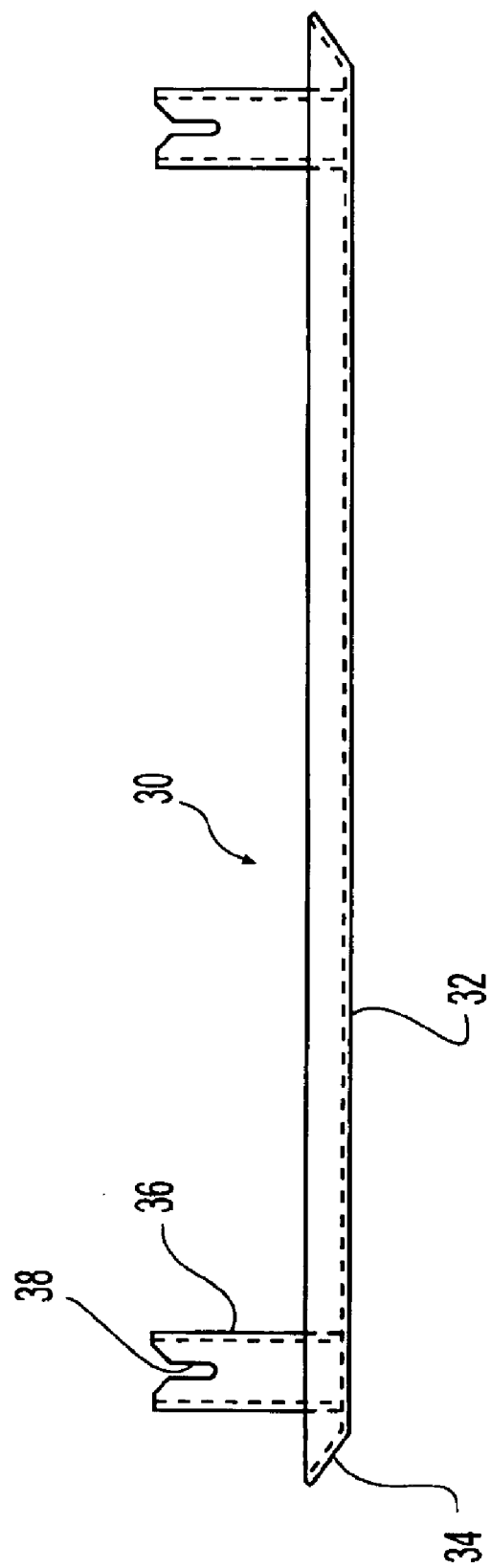
FIG. 3 illustrates a front elevation view of the pan of FIGS. 2A–2B, in accordance with an embodiment of the present invention.

FIGS. 1A–1E illustrate isometric views of a submergible strainer 10, in accordance with an embodiment of the present invention. FIG. 1A shows a top plan view of the strainer 10 of the present invention, while FIG. 1B shows a front elevation view, FIG. 1C shows a rear elevation view, FIG. 1D shows a bottom plan view and FIG. 1E shows the right side elevation view, it being understood that the left side elevation view would be a mirror image thereof.

Referring to FIGS. 1A–1E, the strainer 10 comprises a substantially closed, submergible, hollow structure 12, in the particular embodiment illustrated being a rectangular box-like structure enclosing a volume of space. In an embodiment anticipated but not illustrated, the hollow structure could be, for example, cylindrical, with a circular plan aspect instead of a rectangular plan aspect. The top wall 14 of the structure 12 is essentially flat and featureless, and, importantly, closed, so that water does not flow in or out of the structure through the top wall. Side walls are essentially identical, with the exception being the front wall 16A, in which a hole (i.e., opening) is formed and a threaded hose connection 18 is provided. The rear wall 16D is featureless and side walls 16B, 16C can be featureless, although the embodiment illustrated shows them having handles 20. As shown in phantom in FIGS. 1A–1D, the interior of the strainer 10 comprises enclosed volumes of space 50 or air chambers formed on either side of a water passageway 52. The air chambers 50 are generally shown having a square cross-section and extending the length of the strainer housing to each form an enclosed rectangular space. The water passageway 52 is shown between air chambers 50 and is shown having a generally rectangular cross-section and extending the length of the strainer housing. The water passageway 52 has a water inlet shown generally at 24 and an outlet shown generally at 18. The inlet 24 allows water into the water passageway 52 and outlet 18 allows water out of the water passageway 52. The strainer 10 may also comprise air pressurization ports 60 associated with each air chamber 50. The air pressurization ports 60 allow the air chambers 50 to be filled with an appropriate amount of pressurized air.

Notably, bottom wall 22 has a significant portion thereof cut out, with the holes (or openings) thereby created being covered by a sieve-like material, in this case, expanded metal plates 24. In a particular embodiment, the expanded metal plates 24 have holes that are approximately 0.25"× 0.75" holes. To the inventor's knowledge, these holes are significantly larger than holes on competing products on the market, but these larger openings may be used because the other features of the device permit them. The configuration of the expanded metal plates 24 increases the amount of water through-put.

Each of the side walls 16A–16D has a cut out portion 26 in the center bottom, at a point actually below the bottom wall 22, as particularly seen in FIG. 1B. These cutout portions 26 effectively provide the strainer 10 with corner-positioned legs to hold the bottom wall 22 above a surface on which the strainer 10 may be placed. These legs then help to define an antechamber through which all water must pass before passing through the expanded metal plates 24 into an interior of the substantially closed structure 12 and then out of the structure 12 through the hose connection 18. Each of the legs has a bore 27 (see FIG. 2B) which will be used in attaching the strainer to a pan, as described below.

The strainer 10 may be used in a clean body of water with a flat, solid bed in the manner shown in FIGS. 1A–1E, that is, without any pan as will be described below. For example, the strainer 10 could be used to obtain water from a clean swimming pool.

FIGS. 2A–2B illustrate elevation views of the strainer 10 of FIGS. 1A–1E with a pan 30 in place, in accordance with an embodiment of the present invention. In many situations, such as in a sandy beachfront or along a stream containing gravel, the strainer 10 would preferably be used in conjunction with the pan 30 that also comprises a part of the present invention. FIGS. 2A–2B show the strainer 10 assembled with the pan 30, FIG. 2A being a front elevation view and FIG. 2B being a side elevation view.

FIG. 3 illustrates a front elevation view of the pan 30 of FIGS. 2A–2B, in accordance with an embodiment of the present invention. General features of the pan 30 are seen in FIGS. 2A–2B and FIG. 3. These include a flat pan bottom 32, of rectangular shape to conform the pan 30 with strainer 10, an outwardly angled set of side walls 34 and four stanchions or stems 36 for attaching the pan to the strainer in a fixed, spaced-apart manner. Particularly noted are the angle of about 32 degrees between the wall 34 and the horizontal. While this angle is generally preferred, the angle is expected to be able to vary between 25 and 45 degrees and still remain effective.

FIGS. 4A–4B illustrate a top plan view and a side elevation view of the pan 30 of FIGS. 2A–2B, in accordance with an embodiment of the present invention. Also noted in FIGS. 4A–4B is a front view of stanchion 36, showing, at the distal or upper end, a slot 38 for receiving a side wall (16A, 16B, 16C, or 16D) of the strainer 10. The rectangular plan aspect of the pan 30 is clearly seen in FIG. 4A, with the corner placements of the stanchions 36. FIG. 4B shows a side elevation view of the pan 30, with a bore 40 shown at the distal or upper end of each stanchion 36. When the strainer 30 is seated atop the pan with the side walls 16A–16D (e.g., legs of the sidewalls) positioned in the slots 38 (not shown in FIG. 4B), the bores 40 in the stanchions 36 may be aligned with the bores 27 in the side walls 16A–16D. The aligned bores then provide a situs for insertion of pins or similar fasteners. In this manner, the pan 30 may be easily attached to or removed from the strainer 10.

Figure 5B:
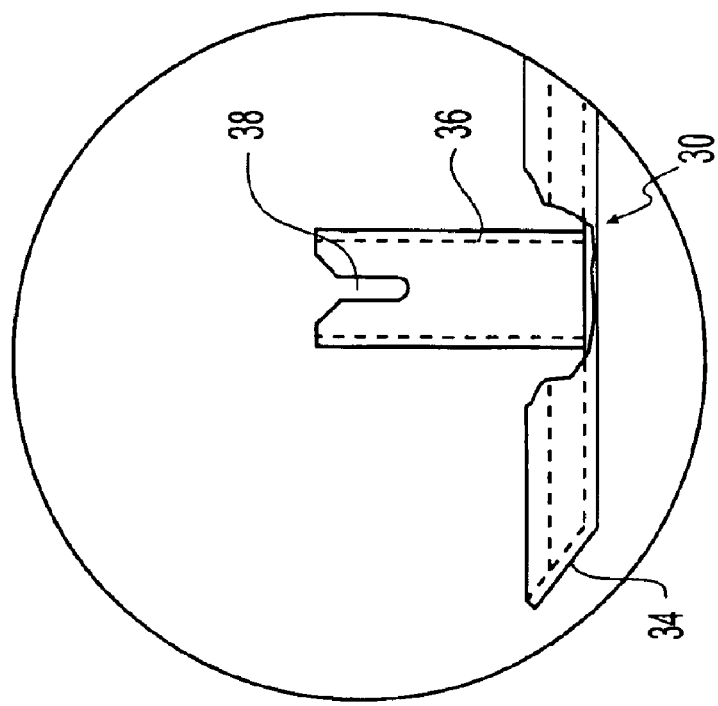
FIGS. 5A–5B illustrate details of the attachment of the pan of FIGS. 2A–2B to the strainer of FIGS. 2A–2B, in accordance with an embodiment of the present invention.
Figure 5A:
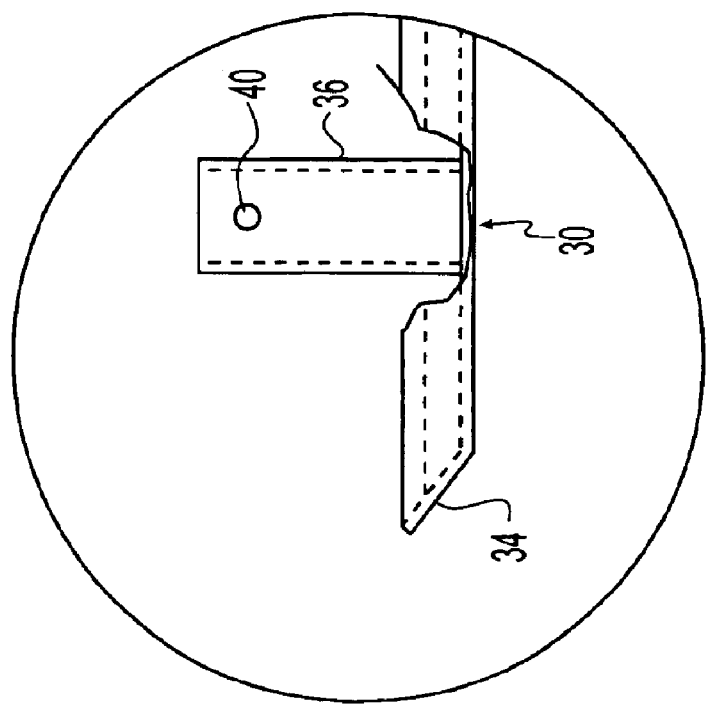

FIGS. 5A–5B illustrate details of the attachment of the pan 30 of FIGS. 2A–2B to the strainer 10 of FIGS. 2A–2B, in accordance with an embodiment of the present invention. Clearer understanding of the side and front aspects of the upper ends of the stanchions 36, especially slots 38 and bores 40, will be had by reference to FIGS. 5A–5B, which show these aspects in detail.

When a pan 30 having the angular side wall structure disclosed herein is used in a body of water with a sandy or gravelly base, it has been noted that flow rates of water in excess of 1500 gallons per minute, and preferably in the range of 1700 to 2000 gallons per minute, are achieved without any stirring or roiling of the sand or gravel base. Because of this, the combination of the strainer 10 and the pan 30, which sits on the bottom of the body of water, may be used to draw water successfully in water sources as shallow as 3.5", a feat which is impossible with riser-type or floating strainer devices.

Figure 6:
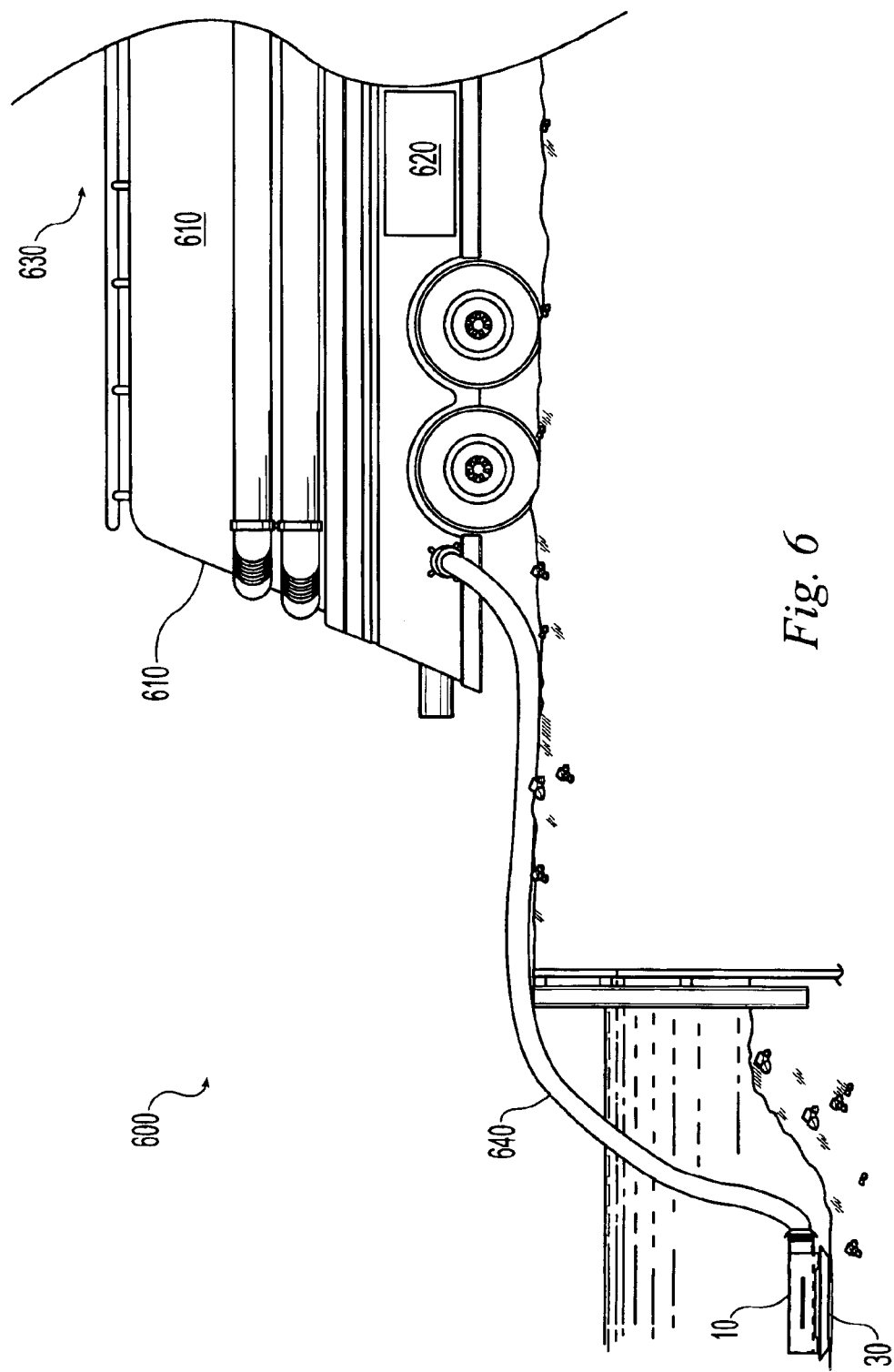
FIG. 6 is a schematic block diagram of an embodiment of a system using the strainer of FIGS. 1A–1E, in accordance with various aspects of the present invention.

FIG. 6 is a schematic block diagram of an embodiment of a system 600 using the strainer 10 of FIGS. 1A–1E, in accordance with various aspects of the present invention. The system 600 comprises a strainer 10 attached to a pan 30. The system further comprises a tank 610 and a pump 620. In accordance with an embodiment of the present invention, the tank 610 and the pump 620 are part of a truck 630 (e.g., a tanker/pumper fire truck). The system 600 includes a hose 640 which connects an outlet of the strainer 10 to an inlet of the tank 610.

Figure 7:
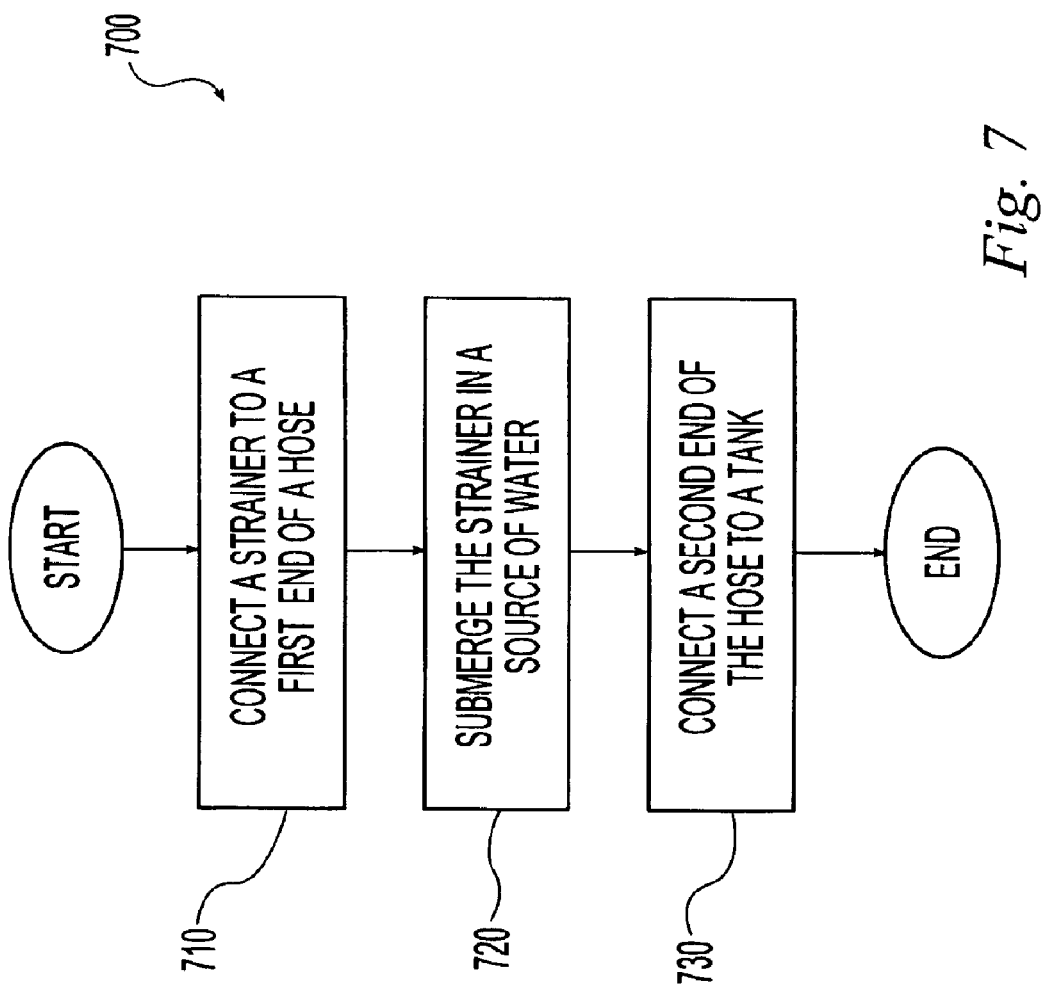
FIG. 7 is a flowchart of an embodiment of a method to sieve and transport water using the system of FIG. 6, in accordance with various aspects of the present invention.

FIG. 7 is a flowchart of an embodiment of a method 700 to sieve and transport water using the system 600 of FIG. 6, in accordance with various aspects of the present invention. In step 710, a strainer is connected to a first end of a hose. In step 720, the strainer is submerged in a source of water. In step 730, a second end of the hose is connected to a tank.

Referring again to FIG. 6, the strainer 10 is shown as being submerged in a source of water such as, for example, a pond. The strainer 10 is elevated by the pan 30 via the stanchions 36. The hose 640 connects to a threaded hose connector of the strainer 10. The other end of the hose 640 connects to the tank 610 of the truck 630. During operation, the pump 620 creates a difference in pressure between the tank 610 and the strainer 10 such that water is drawn into the bottom of the strainer 10 above the pan 30. The strainer/pan combination prevents foreign objects (e.g., rocks, sand, leaves, gravel, etc.) from entering the system 600. When the tank 610 is filled with water, the water in the tank 610 may be dispersed onto a fire via other means in order to put out the fire.

In summary, embodiments of the present invention provide an apparatus, a system and a method for obtaining sieved water, for fighting fires, from a source of water having foreign objects. A strainer is connected to a tank via a hose such that water may be pumped from the strainer to the tank. The strainer includes a water inlet having a sieve-like material over it and a water outlet connector where the hose connects. During operation, the strainer is submerged in a source of water such as a pond or stream. As water enters the strainer via the water inlet, the sieve-like material prevents foreign objects such as rocks and leaves from entering the strainer. A pan may be connected to the bottom of the strainer to elevate the strainer above the bottom of the source of water. Such elevating helps achieve desired flow rates without stirring or roiling foreign objects such as sand or gravel that may be at the bottom of the source of water.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A water strainer apparatus comprising:
    a strainer housing comprising a first opening in the housing forming an inlet, a second opening in the housing forming an outlet, a water passageway between the housing inlet and outlet, and an enclosed air chamber;
    a sieve-like material mounted to the strainer housing over the housing inlet;
    a connector mounted over the outlet of the strainer housing;
    a pan; and
    at least one stanchion connecting the pan to the strainer housing; wherein the pan is positioned in a spaced relationship to the inlet of the strainer housing.

2. The water strainer apparatus of claim 1, wherein the sieve-like material comprises an expanded metal plate with holes.

3. The water strainer apparatus of claim 1, wherein a wall of the pan is angled from a base of the pan generally at an angle between 25 and 45 degrees.

4. The water strainer apparatus of claim 1, wherein the strainer housing further comprises an air pressurization port which allows pressurization of the air within the enclosed air chamber of the strainer housing.

5. A system for obtaining strained water from a source, the system comprising:
    a water strainer apparatus comprising a strainer housing, a pan, and at least one stanchion connecting the pan to the strainer housing in a spaced relationship, the strainer housing comprising a first opening in the housing forming an inlet, a second opening in the housing forming an outlet, a sieve-like material mounted to the strainer housing over the housing inlet, a water passageway between the housing inlet and outlet, and an enclosed air chamber;
    a tank to hold a volume of the strained water; and
    a hose connected between the water strainer apparatus and the tank to transport the strained water from the water strainer apparatus to the tank.

6. The system of claim 5, wherein the water strainer apparatus further comprises a threaded hose connector mounted to the strainer housing over the outlet opening of the strainer housing to allow connection of the hose to the water strainer apparatus.

7. The system of claim 5, further comprising a pump to create a difference in pressure between the water strainer apparatus and the tank such that the water moves from the water strainer apparatus to the tank via the hose.

8. The system of claim 7 wherein the tank is part of a truck.

9. The system of claim 7 wherein the pump is part of a truck.

10. The system of claim 5, wherein the strainer housing further comprises an air pressurization port which allows pressurization of the air within the enclosed air chamber of the strainer housing.

11. The water strainer apparatus of claim 5, wherein a sidewall of the pan is angled from a base of the pan generally at an angle between 25 and 45 degrees.

12. A method to obtain sieved water from a source for fighting fires, said method comprising:
    providing a water strainer apparatus comprising a strainer housing, a pan, and at least one stanchion connecting the pan to the strainer housing in a spaced relationship, the strainer housing comprising a first opening in the housing forming an inlet, a second opening in the housing forming an outlet, a sieve-like material mounted to the strainer housing over the housing inlet, a water channel between the housing inlet and outlet, and an enclosed air chamber;
    submerging at least the inlet of the water strainer apparatus in a source of water; and
    connecting a second end of said hose to a tank.

13. The method of claim 12, further comprising the step of pumping the water from the source into the water strainer apparatus, through the hose, and into the tank.

* * * * *